Oct. 5, 1965
W. J. DUNNET
3,210,568
DIRECTLY COUPLED UNBALANCED TUNNEL DIODE PAIRS FOR LOGIC CIRCUITS
Filed May 1, 1962
4 Sheets-Sheet 1

INVENTOR.
W.J. DUNNET
BY F. J. Sullivan
ATTORNEY

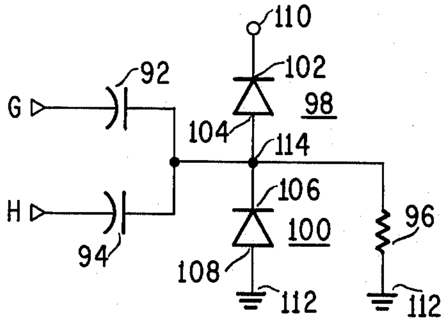
Fig. 6
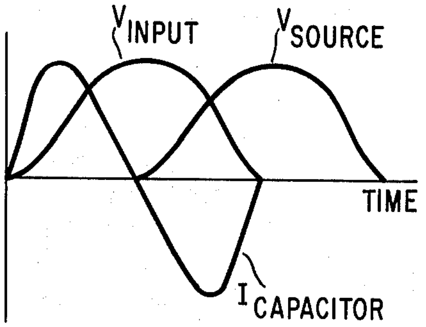
Fig. 7
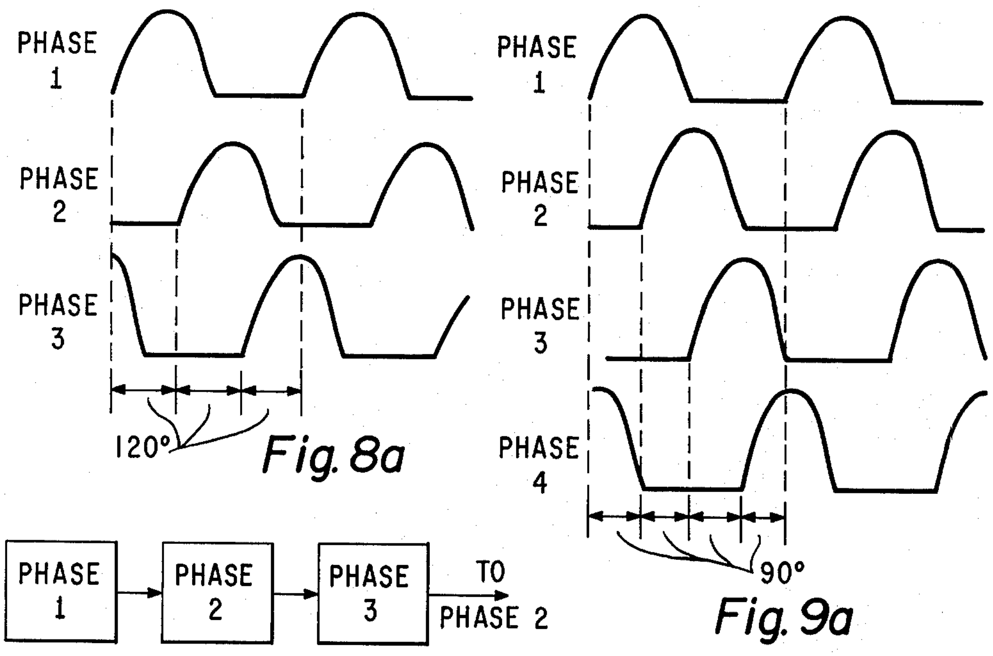
Fig. 8a Fig. 9a
Fig. 8b
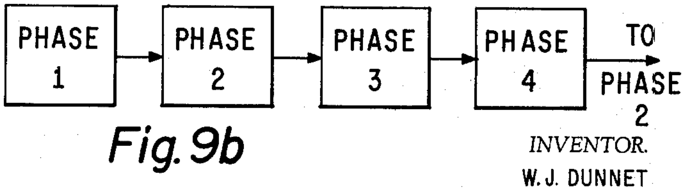
Fig. 9b
INVENTOR.
W. J. DUNNET
BY F. L. Sullivan
ATTORNEY

| | | | | |
|---|---|---|---|---|
| X | 0 | 1 | 0 | 1 |
| Y | 0 | 0 | 1 | 1 |
| SUM | 0 | 1 | 1 | 0 |

INVENTOR.
W.J. DUNNET
BY F. L. Sullivan
ATTORNEY

INVENTOR.
W.J. DUNNET
BY F. J. Sullivan
ATTORNEY 3,210,568
Patented Oct. 5, 1965

1

3,210,568

DIRECTLY COUPLED UNBALANCED TUNNEL DIODE PAIRS FOR LOGIC CIRCUITS

Wallace J. Dunnet, Fayville, Mass., assignor to Sylvania Electric Products Inc., a corporation of Delaware Filed May 1, 1962, Ser. No. 191,632
3 Claims. (Cl. 307—88.5)

This invention is concerned with electronic data processing circuitry, and particularly with the performance of logical operations in such circuitry.

The high-speed characteristic of tunnel diodes would appear to make them ideal for use in electronic data processing systems. Hitherto, however, they have seen limited use in such systems, mainly because of the need for close device tolerances and the difficulty in directly cascading individual logic circuits to form more complex logical functions.

The use of two tunnel diodes in series to form what is known as a locked pair has been proposed for switching opeartions (refer. Goto, E., et al., On the Possibility of Building a Very High Speed Computer With Esaki Diodes, Paper of Electronic Computer Technical Committee, IECEJ–Japanese, October 1959), and this basic locked pair has been incorporated into resistance coupled circuits operating on a majority principle, i.e. the polarity of the output signal is the same as that of the majority of input signals. Complex logical functions, however, generally cannot be accomplished by directly cascading these majority circuits because an inversion of the input is not available. If standard inverters such as transistors or transformers are used in conjunction with these locked pair circuits for inversion purposes, the circuit speed advantages of the tunnel diodes are lost. Furthermore, majority circuits require extremely close device tolerances because in the design of a given circuit to accommodate it to a given number of inputs in the performance of an AND, OR, etc. logical function one or more unconditional inputs are required, in addition to the logically conditioned inputs, to create the proper majority situation. These added inputs load the center point of the locked pair so that extremely close tolerances must be placed on circuit components. This reduces the number of conditional inputs available for logical operations.

An unbalanced locked pair circuit is described in an article entitled "Negative Resistance Elements as Digital Computer Components" by Morton H. Lewin, which may be found in the 1959 Proceedings of the Eastern Joint Computer Conference, p. 19. This circuit utilizes a tunnel diode pair whose components have identical characteristic curves and unbalance is maintained by a constant bias current source whose direction of current flow determines which tunnel diode will switch first. It can be arranged to give a positive signal response as along as all of its inputs are at ground level and a ground level output in response to a negative signal at any of its inputs. Thus, it can be utilized to perform AND, OR, NOR, etc. logic. The bias current source, however, tends to load the center point of the locked pair in a manner similar to the unconditional inputs of the majority circuit so that close tolerances are required.

Accordingly, a primary object of the present invention is to provide an improved locked pair circuit having fairly wide input component tolerances. A further object is to provide a means whereby locked pair circuits of

2 the same or different logic functions may be directly cascaded. Another object is to provide improved data processing techniques.

These and related objects are accomplished in one embodiment of the invention by a polyphase system wherein a given logic block may be implemented by either a basic resistance-coupled, unbalanced locked pair circuit or the dual of this circuit which logically operates upon the opposite polarity input pulse. To provide more versatility to the logic designer, a corresponding capacitance-coupled, unbalanced locked pair circuit and its dual are also available wherein the capacitor shifts the phase of an input pulse causing it to appear inverted. Unbalance is maintained in these circuits by utilizing two tunnel diodes which switch at different current values. The selection of a circuit to perform the logic function depends upon the polarity of the input pulse, the desired output polarity, and the polyphase power system being employed. With these circuits it is possible to cascade directly unbalanced locked pair circuits of any function regardless of input polarity.

This embodiment of the invention will now be explained in more detail, and other features, embodiments, and modifications of the invention will be apparent from this explanation and reference to the accompanying drawings, wherein.

Figure 2:
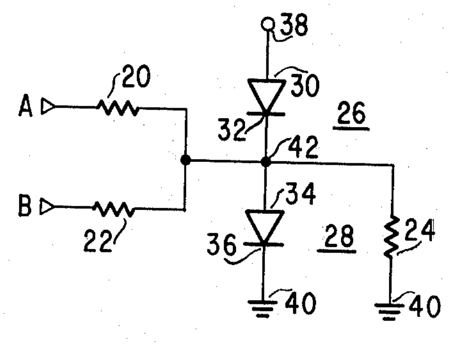
FIG. 2 is a diagrammatic representation of a resistance-coupled, unbalanced locked pair circuit.
Figures 3A, 3B:
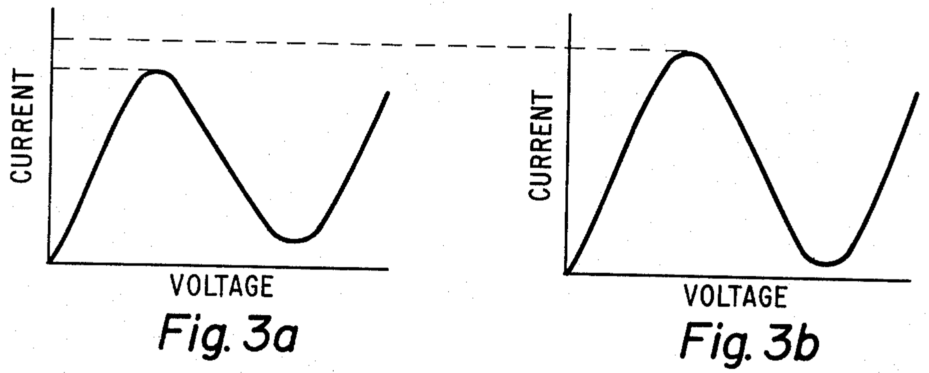
Figure 4:
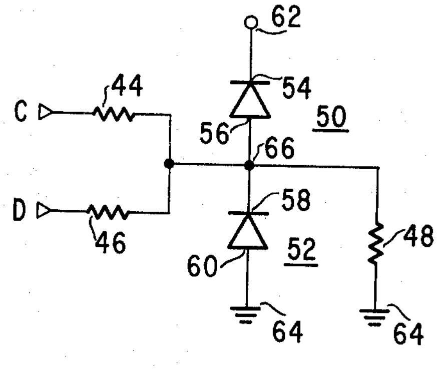
Figure 5:
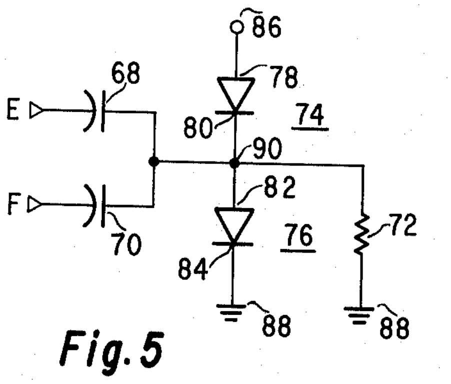
Figures 10, 11:
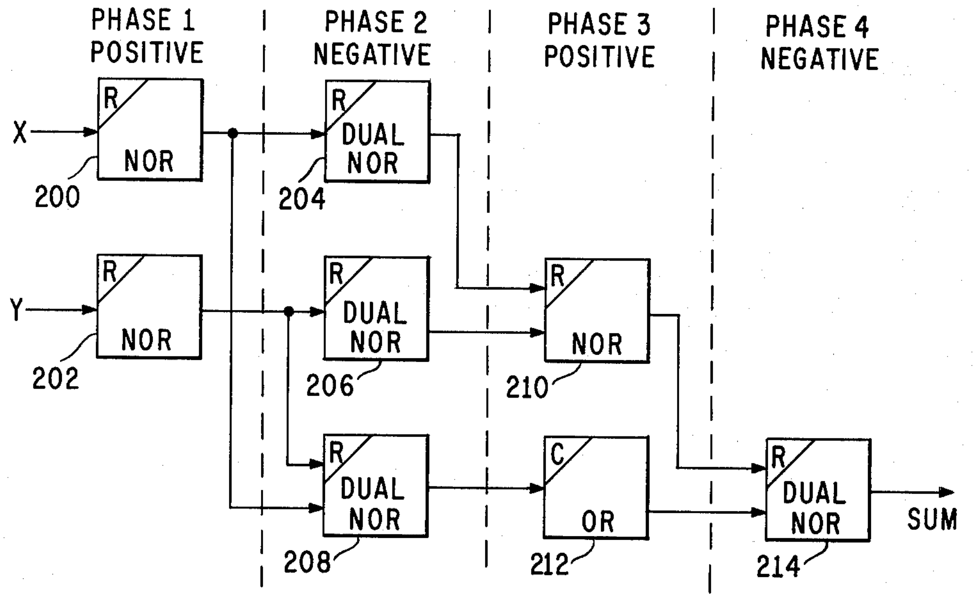

FIGS. 3*a* and 3*b* are characteristic curves of an unbalanced locked pair of tunnel diodes;

FIG. 4 is a diagrammatic representation of a resistance-couple, unbalanced locked pair circuit which is the dual of the circuit of FIG. 2;

FIG. 5 is a diagrammatic representation of a capacitance-couple, unbalanced locked pair circuit;

FIG. 6 is a diagrammatic representation of the dual of the capacitance-couple, unbalanced locked pair circuit of FIG. 5;

FIG. 7 is a diagrammatic representation of input current and voltage to the capacitance-coupled, unbalanced locked pair circuit;

FIGS. 8*a* and 8*b* are diagrammatic representations of a three phase power system;

FIGS. 9*a* and 9*b* are diagrammatic representations of a four phase power system;

FIG. 10 is a symbolic diagram of the addition of two bits; and

Figure 12:
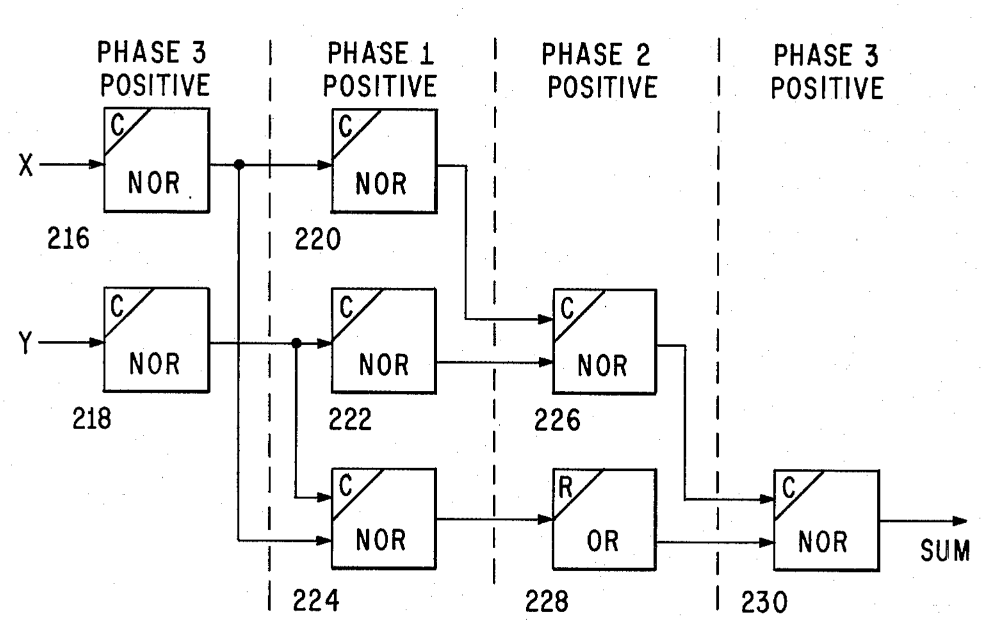
Figure 13:
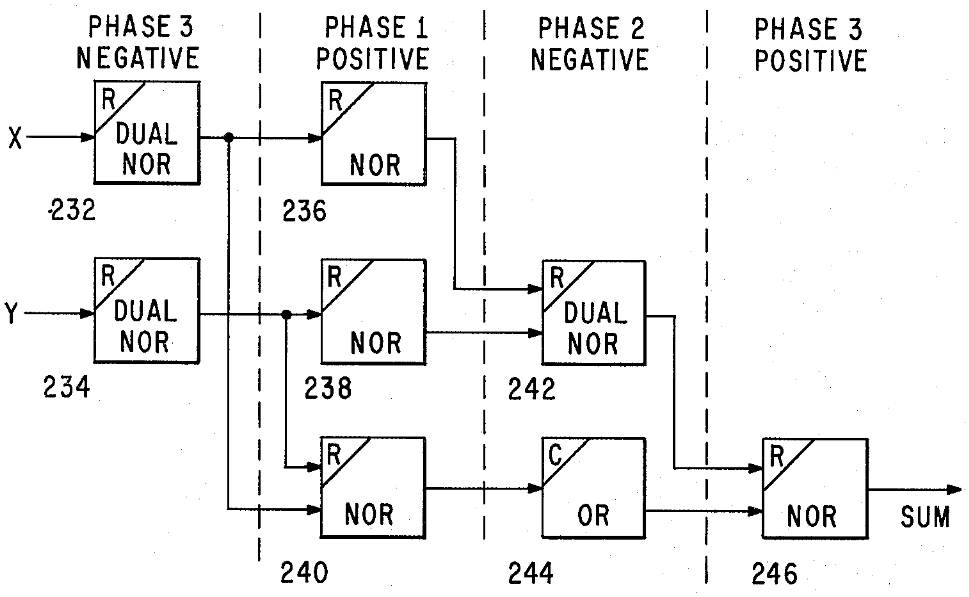

FIGS. 11, 12, and 13 are schematic diagrams of the unbalanced locked pair logic for implementing the addition of two bits.

Figure 1:
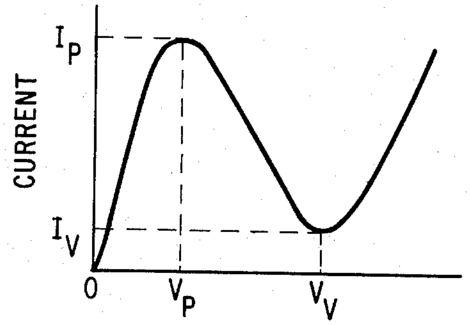
FIG. 1 is a diagram of a characteristic tunnel diode curve.

FIG. 1 represents the characteristic curve of a tunnel diode. Current increases as voltage increases until a peak voltage, $V_p$, is reached. After voltage passes this peak, a further increase in voltage results in a current decrease. This inverse effect continues until the curve slope again reverses at that point of the curve which is called the valley. The valley voltage is designated as $V_v$ and its corresponding current as $I_v$. A further increase in voltage again produces a current increase.

*Unbalanced locked pair circuits*

A resistance-coupled, unbalanced, locked pair circuit is shown in FIG. 2. The locked pair is comprised of tunnel diodes 26 and 28 which are joined at node 42. The positive electrode 30 of tunnel diode 26 is connected to positive pulse source 38 while the negative electrode 32 is connected to node 42. The positive electrode 34 of tunnel diode 28 is connected to node 42 while the negative electrode 26 is connected to ground 40. Input resistor 20 joins input A to node 42; input resistor 22 joins input B to node 42. Resistor 24 represents the impedance of the loads being driven from node 42 and joins it to ground 40.

The circuit of FIG. 2 may be made to operate as either a NOR circuit or an OR circuit, depending upon which tunnel diode 26, 28 has the lower value of peak current.

A NOR circuit is formed (i.e. $\overline{A}+\overline{B}=P$) when tunnel diode 28 has a peak current less than that of tunnel diode 26 and by definition a ONE at the input is a negative pulse, whereas a ONE at the output is a positive pulse. The manner in which the circuit functions may be demonstrated by a comparison of FIG. 3*a* representing tunnel diode 28 and FIG. 3*b* representing tunnel diode 26. If a ONE is not present on either input A or B and positive pulse source 38 is turned on, a race condition exists between the tunnel diodes 26, 28. Since it has a lower value of peak current, tunnel diode 28 reaches and passes its peak first, and in so doing it constrains the current through tunnel diode 26 to a value less than its peak value thereby preventing it from switching. A positive output voltage pulse occurs at node 42 as current flows through tunnel diode 26 and resistor 24 to ground 40. Accordingly, if neither input A nor B is a ONE, a ONE is produced at the output.

However, when a negative ONE pulse is applied to either input A or B, there is an increase in current through tunnel diode 26 so that it reaches its peak current ahead of tunnel diode 28. Node 42 is essentially held at ground and a ONE output pulse is not produced. Thus, the NOR function is satisfied by properly designating a ONE pulse at the input and output and selecting tunnel diodes with the desirable characteristic curves.

An OR circuit is formed (i.e. $A+B=P$) when the characteristic curve of tunnel diode 26 has a lower value of peak current than tunnel diode 28. A ONE is defined as a positive pulse at both the input and output. When a ONE pulse is not present on either input A or B and positive pulse source 38 is turned on, tunnel diode 26 switches and node 42 is held at ground so that no pulse is emitted.

However, when a positive ONE pulse appears on either input A or B, there is an increase in current through tunnel diode 28 which reaches its peak current first and prevents tunnel diode 26 from doing likewise. Current then flows through tunnel diode 26 and resistor 24 to ground 40, producing a positive ONE pulse at node 42. Thus, a positive ONE pulse is emitted if either input A or B is a positive ONE pulse.

In summation of the preceding logic system, a ONE input to a NOR circuit is a negative pulse whereas a ONE output is a positive pulse. A positive pulse, however, is both a ONE output and input in an OR circuit. Consequently, a NOR circuit can drive an OR, but the reverse situation is impossible. One OR circuit can drive another, but it is not possible for a NOR circuit to drive another NOR.

In order to overcome these cascading problems, the dual of the circuit shown in FIG. 2 has been designed and is shown in FIG. 4. The locked pair is comprised of tunnel diodes 50 and 52 which are joined at node 66. The negative electrode 54 of tunnel diode 50 is connected to negative pulse source 62 whereas the positive electrode 56 is connected to node 66. The positive electrode 60 of tunnel diode 52 is connected to ground 64 whereas the negative electrode 58 is connected to node 66. Input resistor 44 joins input C to node 66 and input resistor 46 joins input D to node 66. Resistor 48 represents the impedance of the loads being driven from node 66 and joins it to ground 64.

This circuit operates in a manner similar to that of FIG. 2 and may operate as either a NOR or an OR circuit. A NOR circuit is formed when the characteristic curve of tunnel diode 52 has a lower peak current than tunnel diode 50. By definition, a positive input pulse is a ONE, whereas a negative output pulse is a ONE. When a pulse is not present on either input C or D, tunnel diode 52 reaches its peak first and current flows from ground 64 through resistor 48 and tunnel diode 50 to negative pulse source 62, producing a negative ONE output pulse. Thus, if neither input C nor D is a ONE, a ONE is emitted.

However, when a positive ONE pulse appears on either input C or D, additional current flows through tunnel diode 50 so that it reaches its peak first. Node 66 is essentially held at ground so that a ONE cannot be produced. Consequently, the NOR function is satisfied.

An OR circuit is formed when the characteristic curve of tunnel diode 50 has a lower peak current than tunnel diode 52. When no pulse appears on either input C or D and negative voltage source 62 is turned on, tunnel diode 50 reaches its peak first. Node 66 is essentially held at ground so that no output ONE pulse may be produced.

However, when a negative ONE pulse appears on either input C or D, additional current flows through tunnel diode 52 causing it to reach its peak first. Current flows from ground 64, through resistor 48 and tunnel diode 50, to negative pulse source 62, so that a negative ONE pulse is produced at node 66. Thus, a negative ONE pulse is emitted if either input C or D is a negative ONE pulse.

By having the dual circuit of FIG. 4 available, the drive problems previously mentioned may be overcome. An OR circuit may now drive a NOR by using the dual OR and the basic NOR. A NOR circuit can drive another NOR by using one basic circuit and one dual.

As explained in co-pending U.S. patent application Ser. No. 191,502 filed May 1, 1962, also assigned to Sylvania Electric Products Inc., it is possible to employ reactive coupling elements in the unbalanced configuration to achieve logical inversion in an OR function. This makes it possible to avoid the use of dual circuitry in some cascading situations. A basic capacitance-coupled circuit is shown in FIG. 5. This locked pair is comprised of tunnel diodes 74 and 76 which are joined at node 90. The positive electrode 78 of tunnel diode 74 is connected to positive pulse source 86 and the negative electrode 80 is connected to node 90, whereas the positive electrode 82 of tunnel diode 76 is connected to node 90 and the negative electrode 84 is connected to ground 88. Input capacitor 68 joins input E to node 90 while input capacitor 70 joins input F to node 90. Resistor 72 represents the impedance of the loads being driven from node 90 and joins it to ground 88.

The function of the capacitors will become evident after referring to FIG. 7. A ONE input is a positive pulse which is actually half of a sine wave. The associated capacitor 68 or 70 acts as a differentiator so that the current into node 90 follows the cosine curve since the differential of a sine is a cosine. Therefore, the current curve rises quickly to a maximum and follows the cosine wave until the end of the positive input pulse. If the input pulse were a full sine wave, the current curve would not reach the time axis for 90° after the input voltage reaches it. However, since the input voltage is only half a sine wave, the current drops to zero. Thus, the current appearing at node 90 appears first as a positive pulse and then as a negative pulse.

The circuit of FIG. 5 may operate as either a NOR circuit or an OR circuit. A NOR circuit is formed when the characteristic curve of tunnel diode 76 has a lower peak current than tunnel diode 74. A positive pulse is designated as a ONE at both the input and output. When a pulse is not present on either input E or F and positive pulse source 86 is turned on, tunnel diode 76 reaches its peak first and switches causing current to flow through tunnel diode 74 and resistor 72 to ground 88. A positive voltage pulse then occurs at node 90. Thus, when neither E nor F is a ONE, a ONE is produced at the output.

When a positive ONE pulse occurs on either input E or F, it is differentiated as shown in FIG. 7. When source 86 is turned on, the input pulse is negative so that tunnel diode 74 reaches its peak first. Node 90 is essentially held at ground so that no output pulse is emitted. Since a positive pulse is a ONE at both the input and output of this circuit, one circuit can drive another.

An OR circuit is formed when the characteristic curve of tunnel diode 74 has a lower peak current than tunnel diode 76. A ONE is a negative pulse at the input and a positive pulse at the output. If no signal is present on input E or F and positive voltage source 86 is turned on, tunnel diode 74 switches to it speak first. Node 90 is essentially held at ground so that no output pulse is emitted.

However, when a negative ONE pulse appears on either input E or F, it is differentiated and appears as a positive pulse after positive pulse source 86 is turned on. Additional current flows through tunnel diode 76 causing it to reach its peak first so that output current flows through tunnel diode 74 and resistor 72 to ground 88. A positive ONE pulse is then produced if any input is a negative ONE pulse. This circuit is actually a polarity inverter.

The circuit of FIG. 6 is the dual of FIG. 5. The locked pair of FIG. 6 is comprised of tunnel diodes 98 and 100 which are joined at node 114. The positive electrode 104 of tunnel diode 98 is connected to node 114 whereas the negative electrode 102 is connected to negative pulse source 110. The positive electrode 108 of tunnel diode 100 is connected to ground 112 whereas the negative electrode 106 is connected to node 114. Input capacitor 92 joins input G to node 114 while capacitor 94 joins input H to node 114. Resistor 96 represents the impedance of the loads being driven from node 114 and joins it to ground 112.

The circuit of FIG. 6 operates as either a NOR circuit or an OR circuit. A NOR circuit is formed when the characteristic curve of tunnel diode 100 has a lower peak current than tunnel diode 98. A negative pulse is a ONE at both the input and the output. If no pulse is present on either input G or H and negative pulse source 110 is turned on, tunnel diode 100 reaches its peak first. A negative ONE pulse appears at node 114 as current flows from ground 112, through resistor 96 and tunnel diode 98 to negative source 110. Thus, when neither G nor H is a ONE, a ONE is produced at the output.

However, when a negative ONE pulse is applied to either input G or H, it is differentiated by the associated capacitor. At the time at which negative source 110 is turned on, the input pulse begins to go positive so that additional current flows through tunnel diode 98 causing it to reach its peak first. Node 114 is essentially held at ground so that no output pulse is produced.

An OR circuit is formed when the characteristic curve of tunnel diode 98 has a lower peak current than tunnel diode 100. If no pulse is present on either input G or H and negative pulse source 110 is turned on, tunnel diode 98 switches first. Since node 114 is essentially at ground, no pulse is emitted.

However, when a positive ONE pulse appears on either input G or H, it is differentiated by its associated capacitor. When negative source 110 is turned on, the input signal begins to go negative. Additional current flows through tunnel diode 100 which switches first causing output current to flow from ground 112, through resistor 96 and tunnel diode 98, to negative pulse source 110 producing a negative pulse at node 114. Thus, a positive ONE input pulse produces a negative ONE output pulse and the circuit acts as a polarity inverter.

*Polyphase power supplies*

It will be noticed that each of the previously described circuits requires a pulsed supply voltage. This is because tunnel diodes are not self-restoring devices and, consequently, any new signal to a locked pair will not affect the pair once it has been set. Thus, in order to store new information, the supply voltages must be returned to zero to restore the tunnel diodes. Hence, a direct current supply cannot be used when performing logic functions, but a pulsed or sine wave supply is adequate.

Since the locked pair is a one-port device, i.e. its input and output are present at one point, it is necessary to prevent an output from driving its own driver as well as the following input. A polyphase system is used to overcome this problem.

FIG. 8*a* shows the voltage waveforms corresponding to each phase of a three phase system. Each supply pulse is separated from the corresponding pulse of the next phase by 120° so that only two pulses are on at the same time. In this manner isolation is achieved which may be shown by referring to FIG. 8*b*. If a circuit operating in phase 3 emits a pulse, it will tend to drive the phase 1 circuit as well as the phase 2 circuit. However, it cannot drive the phase 2 circuit because its power supply is inoperative when the phase 3 circuit produces an output. Thus, the unidirectional flow of signals is assured.

Each phase of FIG. 9*a* is separated from the next phase by 90° so that only two phases can be on at one time and only unidirectional flow of signals is possible. FIG. 9*b* shows the cascading of circuits which use this four phase supply system.

*Addition of two bits*

The co-operation of the circuits previously described and the polyphase pulse systems will become evident from the following description of the logical problem of adding two bits X and Y.

FIG. 10 is a block diagram showing the sum resulting for each possible combination of X and Y. The necessary logic for accomplishing this sum is indicated by the interconnected NOR and OR blocks of FIGS. 11, 12, and 13. The R, C, and dual indications within these clocks represent their circuit implementation according to this invention. The operation of the circuits in each figure will be shown below by illustrating the manner in which they coact to produce the correct sum bit when X and Y are both ZERO bits.

FIG. 11 shows a four phase system using the unbalanced locked pair circuits to perform this add function. Circuits 200 and 202 are resistance-coupled, unbalanced locked pair NOR circuits whose power supplies operate according to the phase 1 waveform of FIG. 9*a*. The X bit is the input to NOR 200 whereas the Y bit is the input to NOR 202. The output from NOR 200 is joined to an input of circuits 204 and 208. The output from NOR 202 is connected to an input of circuit 206 and a second input of circuit 208. Circuits 204, 206, and 208 are resistance-coupled, dual unbalanced locked pair NOR circuits whose power supplies operate according to the phase 2 waveform. The outputs of dual NOR's 204 and 206 are joined to different inputs of circuit 210. The output of dual NOR 208 is connected to circuit 212. Circuits 210 and 212 have power supplies which operate according to the phase 3 waveforms. Circuit 210 is a resistance-coupled, unbalanced locked pair NOR whereas circuit 212 is a capacitance-coupled, unbalanced locked pair OR. The outputs of circuits 210 and 212 are joined to separate inputs of circuit 214, which is a resistance-coupled, dual unbalanced locked pair NOR whose power supply operates according to the phase 4 waveform. The output of dual NOR 214 is the sum bit.

When the X and Y bits are both ZERO's, they are transferred into resistance-coupled, unbalanced locked pair NOR circuits 200, 202 in the form of ground levels causing these circuits to produce positive pulses at their outputs. In this network it is desired to use resistance coupling wherever possible. If, however, NOR circuits 204, 206, and 208 were implemented by the basic resistance-coupled, unbalanced locked pair NOR, they would not be able to perform the NOR function on their inputs since they are all in the form of positive ONE pulses. Consequently, the corresponding dual circuit is used and each circuit emits a ground level representing a ZERO. Since both inputs to resistance-coupled, unbalanced locked pair NOR 210 are ZERO's, it transfers a positive ONE pulse to circuit 214 which is a resistance-coupled, unbalanced locked pair dual NOR so that it can operate on a positive ONE pulse. Capacitance-coupled, unbalanced locked pair OR 212 transfers a ground level or ZERO to circuit 214. A ZERO sum bit is produced by resistance-coupled, unbalanced locked pair dual NOR 214 because one of its inputs is a positive ONE pulse.

A second means for performing the add function with unbalanced locked pair circuits is the three phase system of FIG. 12. Circuits 216 and 218 are capacitance-coupled, unbalanced locked pair NOR circuits whose power supplies operate according to the phase 3 waveform of FIG. 8*a*. The X bit is the input to NOR 216 where as the Y bit is the input to NOR 218. The output from NOR 216 is joined to an input of circuits 220 and 224. The output from NOR 218 is connected to an input of circuit 222 and a second input to circuit 224. Circuits 220, 222, and 224 are capacitance-coupled, unbalanced locked pair NOR circuits whose power supplies operate according to the phase 1 waveform. The outputs of NOR's 220 and 222 are joined to different inputs to circuit 226. The output of NOR 224 is connected to circuit 228. Circuits 226 and 228 have power supplies which operate according to the phase 2 waveform. Circuit 226 is a capacitance-coupled, unbalanced locked pair NOR circuit whereas circuit 228 is a resistance-coupled, unbalanced locked pair OR circuit. The outputs of circuits 226 and 228 are joined to separate inputs of circuit 230, which is a capacitance-coupled, unbalanced locked pair NOR whose power supply operates according to the phase 3 waveform. The output of NOR 230 is the sum bit. This means of implementation does not require any dual circuits.

If the X and Y bits are both ZERO's, capacitive-coupled, unbalanced locked pair NOR's 216 and 218 receive them in the form of ground levels and produce positive ONE pulses. Circuits 220, 222, and 224 are capacitive-coupled, unbalanced locked pair NOR circuits each of which emits a ground level representing a ZERO because their inputs are positive ONE pulses. Capacitive-coupled, unbalanced locked pair NOR 226 produces a positive ONE pulse because both its inputs are ZERO's. Resistance-coupled, unbalanced locked pair OR transmits a ground level or ZERO to circuit 230. A ZERO sum bit is produced by capacitance-coupled, unbalanced locked pair NOR 230 because its input from circuit 226 is a positive ONE pulse.

Another means for performing the add function with unbalanced locked pair circuits is the three phase system of FIG. 13. Circuits 232 and 234 are resistance-coupled, dual unbalanced locked pair NOR circuits whose power supplies operate according to the phase 3 waveform of FIG. 8*a*. The X bit is the input to dual NOR 232 whereas the Y bit is the input to dual NOR 234. The output from dual NOR 232 is joined to an input of circuits 236 and 240. The output from dual NOR 234 is connected to an input of circuit 238 and a second input to circuit 240. Circuits 236, 238, and 240 are resistance-coupled, unbalanced locked pair NOR circuits whose power supplies operate according to the phase 1 waveform. The outputs of NOR's 236 and 238 are joined to different inputs of circuit 242. The output of NOR 240 is connected to circuit 244. Circuits 242 and 244 have power supplies which operate according to the phase 2 waveform. Circuit 242 is a resistance-coupled, dual unbalanced locked pair NOR whereas circuit 244 is a capacitance-coupled, dual unbalanced locked pair OR circuit The outputs of circuits 242 and 244 are joined to separate inputs of circuit 256, which is a resistance-coupled, unbalanced locked pair NOR circuit whose power supply operates according to the phase 3 waveform. The output of NOR 246 is the sum bit.

When the X and Y bits are both ZERO'S, the resistance-coupled, dual NOR circuits 232 and 234 receive them in the form of ground levels and emit negative ONE pulses. Since resistance coupling is desired whenever possible in this network, NOR's 236, 238 and 240 are implemented by resistance-coupled, unbalanced locked pair NOR circuits because they, and not their dual, are capable of performing the NOR function on negative pulses. These circuits produce ground levels or ZERO's because each of their inputs are ONE's. Resistance-coupled, unbalanced locked pair dual NOR 242 transfers a negative ONE pulse to circuit 246 and capacitance-coupled, unbalanced locked pair dual OR 244 transmits a ZERO or ground level to circuit 246. The resistance-coupled, unbalanced locked pair NOR 246 produces a ZERO sum bit which is a ground level because its input from circuit 242 is a negative ONE pulse.

The operation of each of the networks shown in FIGS. 11, 12, and 13 will be apparent to anyone skilled in the electronic data processing art for the three remaining conditions of X and Y. Consequently, the present description will not be burdened with such an explanation. Also, other combinations for performing other functions are readily apparent.

Although each circuit described herein has been shown with only two inputs, this is merely due to the particular problem under illustration and additional numbers of inputs are practicable. If the input pulses are in the form of half-square waves, a phase shifting network such as a T filter may be used in place of the capacitor. The invention is not limited to the specific examples, features, and logical combinations shown and described, but embraces the full scope of the following claims.

What is claimed is:

1. A multistage, directly cascaded, unbalanced locked pair tunnel diode logic circuit comprising, in combination, a plurality of tunnel diode locked pairs each including first and second tunnel diodes which switch at different current values, each alternate locked pair being the dual of the adjacent locked pair, a polyphase power source connected to said plurality of locked pairs and operative to sequentially energize each locked pair, an input circuit connected to the first stage of said logic circuit and operative to couple input pulses thereto, and an output circuit connected to the last stage of said logic circuit for transferring output pulses therefrom.

2. A multistage, directly cascaded, unbalanced locked pair tunnel diode logic circuit comprising, in combination, a first plurality of tunnel diode locked pairs each including first and second tunnel diodes having respective first and second peak current values, a second plurality of tunnel diode locked pairs each including first and second tunnel diodes having respective first and second peak current values, said second plurality of locked pairs being alternately connected to and being the dual of said first plurality of locked pairs, a first source of energizing signals of one polarity connected to said first plurality of locked pairs, a second source of energizing signals of opposite polarity from said first source connected to said second plurality of locked pairs, an input circuit connected to the first stage of said logic circuit and operative to couple input pulses thereto, and an output circuit connected to the last stage of said logic circuit for transferring output pulses therefrom.

3. A multistage, directly cascaded, unbalanced locked pair tunnel diode logic circuit comprising, in combination, a source of reference potential, a first source of pulses of one polarity, a second source of pulses of opposite polarity from said first source, a first tunnel diode locked pair including first and second tunnel diodes having respective first and second peak current values and connected in series between said first source of pulses and said source of reference potential, a second tunnel diode locked pair which is the dual of said first locked pair and which includes first and second tunnel diodes having respective first and second peak current values and connected in series between said second source of pulses and said source of reference potential, an input circuit connected to said first locked pair for coupling input pulses thereto, and an output circuit connected to said second locked pair for transferring output pulses therefrom.

References Cited by the Examiner

UNITED STATES PATENTS

| | | | |
|---|---|---|---|
| 3,054,911 | 9/62 | Buelow | 307—88.5 |
| 3,120,653 | 2/64 | Miller et al. | 307—88.5 |

OTHER REFERENCES

Pub. III, G.E. Tunnel Diode Manual, March 20, 1961, pp. 58 and 59.

Pub. II, G.E. Tunnel Diode Manual, March 20, 1961, pp. 61–62.

Pub. I, IBM Technical Disclosure Bulletin, Ergoth et al., vol. 4, No. 11, April 1962, page 51.

ARTHUR GAUSS, *Primary Examiner.*